United States Patent [19]
Koizumi et al.

[11] Patent Number: 4,794,519
[45] Date of Patent: Dec. 27, 1988

[54] METHOD AND SYSTEM FOR EDITING DISTRIBUTED FILES IN A DATA TRANSMISSION SYSTEM

[75] Inventors: Minoru Koizumi; Kinji Mori, both of Yokohama; Yasuo Suzuki, Ebina; Masayuki Orimo, Kawasaki; Katsumi Kawano, Fuchu; Hirokazu Kasashima, Kanesawacho; Kozo Nakai, Katsuta, all of Japan

[73] Assignee: Hitachi, Ltd., Tokyo, Japan

[21] Appl. No.: 6,017

[22] Filed: Jan. 22, 1987

[30] Foreign Application Priority Data

Jan. 22, 1986 [JP] Japan .................................. 61-12805

[51] Int. Cl.⁴ .............................................. G06F 1/00
[52] U.S. Cl. ..................................... 364/200; 364/300
[58] Field of Search ................................ 364/200, 900

[56] References Cited
U.S. PATENT DOCUMENTS 4,477,881 10/1984 Kobayashi et al. .................. 364/900

Primary Examiner—Raulfe B. Zache
Attorney, Agent, or Firm—Antonelli, Terry & Wands

[57] ABSTRACT

A file editing method and a system therefor is used in a file editing system for sequentially connecting the files, which are stored in memory devices of a plurality of distributed devices connected to a common signal transmission line, to an edition data flowing on the common signal transmission line. Each of the devices sends a structuring message having the combination and order of the files to be connected to the common signal transmission line; judges whether or not its own file is contained in files to be edited on the basis of the structuring message and its own connection information when it receives the structuring message; sends a response message having the information of the file to the common signal transmission line if its own file is contained; and structures a connection information required for the file edition in itself on the basis of the structuring message in case it is confirmed through the message that all the files to be edited exist in the system. As a result, the file edition for editing a desired combination of files can be structured even if the whole structure of the files of the system is unknown, and the file edition can be structured by contracting or expanding devices even if the structure of the files fluctuates.

9 Claims, 12 Drawing Sheets

| INPUT CONTENT CODE $FC_I$ | OUTPUT CONTENT CODE $FC_O$ | LEFT END CONNECTION INFORMATION LFC | CONTENT CODE OF SELF-CONNECTION DATA $FC_S$ |
|---|---|---|---|
| $FC_T$ | $FC_R$ | $FC_A$ | $FC_B$ |
| ⋮ | ⋮ | ⋮ | ⋮ |

FIG. 10
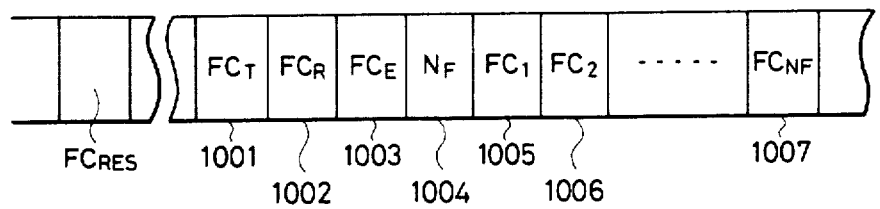
FIG. 11
| FILE EDITION INFORMATION | | | EDITING DATA INFORMATION | | | | | | | | |
|---|---|---|---|---|---|---|---|---|---|---|---|
| TRIGGER FC | FILE EDITION FC | EDITION COMPLETION FC | NUMBER OF EDITING DATA | FC | FLAG | FC | FLAG | FC | FLAG | --- FC | FLAG |
| $FC_T$ | $FC_R$ | $FC_E$ | $N_F$ | $FC_1$ | 0 | $FC_2$ | 1 | $FC_3$ | 0 | --- $FC_{NF}$ | 0 |
| 1101 | 1102 | 1103 | 1104 | 1105 1106 | | 1107 1108 | | 1109 1110 | | 1111 1112 | |
FIG. 12
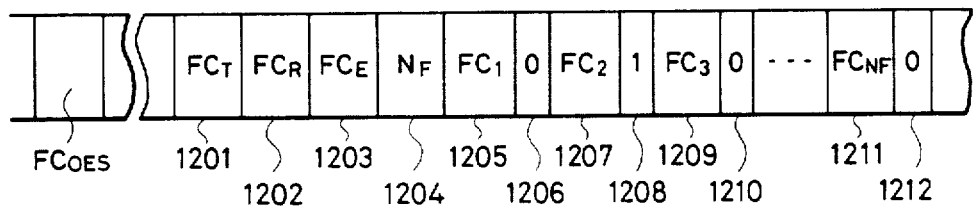

FIG. 16(A)

| DEVICE NUMBER | FILE EDITION INFORMATION | | | EDITING DATA INFORMATION | | | | | | |
|---|---|---|---|---|---|---|---|---|---|---|
| | TRIGGER FC | FILE EDITION FC | EDITION COMPLETION FC | NUMBER OF EDITING DATA | FC | FLAG | FC | FLAG | FC | FLAG |
| $1_2$ | $FC_X$ | $FC_Y$ | $FC_{ABC}$ | 3 | $FC_A$ | 0 | $FC_B$ | 1 | $FC_C$ | 0 |
| $1_3$ | $FC_X$ | $FC_Y$ | $FC_{ABC}$ | 3 | $FC_A$ | 1 | $FC_B$ | 0 | $FC_C$ | 0 |
| $1_4$ | $FC_X$ | $FC_Y$ | $FC_{ABC}$ | 3 | $FC_A$ | 0 | $FC_B$ | 0 | $FC_C$ | 1 |

FIG. 16(B)

| DEVICE NUMBER | FILE EDITION INFORMATION | | | EDITING DATA INFORMATION | | | | | | |
|---|---|---|---|---|---|---|---|---|---|---|
| | TRIGGER FC | FILE EDITION FC | EDITION COMPLETION FC | NUMBER OF EDITING DATA | FC | FLAG | FC | FLAG | FC | FLAG |
| $1_2$ | $FC_X$ | $FC_Y$ | $FC_{ABC}$ | 3 | $FC_A$ | 1 | $FC_B$ | 1 | $FC_C$ | 1 |
| $1_3$ | $FC_X$ | $FC_Y$ | $FC_{ABC}$ | 3 | $FC_A$ | 1 | $FC_B$ | 1 | $FC_C$ | 1 |
| $1_4$ | $FC_X$ | $FC_Y$ | $FC_{ABC}$ | 3 | $FC_A$ | 1 | $FC_B$ | 1 | $FC_C$ | 1 |

FIG. 17

| DEVICE NUMBER | INPUT CONTENT CODE | OUTPUT CONTENT CODE | LEFT END CONNECTION INFORMATION | SELF-CONNECTION DATA CONTENT CODE |
|---|---|---|---|---|
| $1_2$ | $FC_Y$ | $FC_Y$ | $FC_A$ | $FC_B$ |
| $1_3$ | $FC_X$ | $FC_Y$ | FF | $FC_A$ |
| $1_4$ | $FC_Y$ | $FC_{ABC}$ | $FC_B$ | $FC_C$ |

METHOD AND SYSTEM FOR EDITING DISTRIBUTED FILES IN A DATA TRANSMISSION SYSTEM

BACKGROUND OF THE INVENTION

1. Field of the Invention

The present invention relates to a distributed file edition system and, more particularly, to a method and system for editing distributed files, which are stored in a plurality of distributed devices connected to a common signal transmission line.

2. Description of the Prior Art

In the prior art, the technique, by which a plurality of distributed devices connected to a common signal transmission line are filed to correct and edit files stored in them, is disclosed in Japanese Patent Laid-Open No. 97173/1982 or U.S. Pat. No. 4,477,881. According to this technique, each device has stored therein connection information to connect its own file data to edition data received from the transmission line, on the basis of both the edited state of the edition data and the aforementioned connection information.

It is a prerequisite of this distributed file editing technique that the aforementioned connection information be registered in advance in each device, but no consideration is given to the structuring of the system with respect to how the connection information is registered in each system.

In order to realize the edition of the distributed files by the technique described above, however, the aforementioned connection information has to be troublesomely registered in each device upon each file edition and according to the edition content.

SUMMARY OF THE INVENTION

An object of the present invention is to solve the above-specified problem of the distributed file editing technique of the prior art and to provide a distributed file editing method and system, in which connection information required for the aforementioned distributed file editing technique is generated even if the file structure of the whole system is unknown, to edit a new combination of files.

In order to achieve the above-specified object, according to the present invention, in a file editing system for sequentially connecting the files, which are stored in memory devices of a plurality of distributed devices connected to a common signal transmission line, to edition data flowing on said common signal transmission line, each of said devices is characterized by: sending a structuring message having the combination and order to the files to be connected to said common signal transmission line; judging whether or not its own file is contained in a file to be edited on the basis of said structuring message and its own connection information when it receives said structuring message; sending a response message having the information of said file to said common signal transmission line if its own file is contained; and structuring a connection information required for the file edition in itself on the basis of said structuring message in case it is confirmed through said message that all the files to be edited exist in said system.

BRIEF DESCRIPTION OF THE DRAWINGS

FIG. 10 is a diagram showing the format of file edition structuring data;

FIG. 11 is a diagram showing an area for collecting file edition structuring response data;

FIG. 12 is a diagram showing the format of the file edition structuring response data;

FIGS. 16(A) and 16(B) are diagrams showing structural examples of the area for collecting the file edition structuring response data; and FIG. 17 is a diagram showing a specific example of the file editing connection information table.

DETAILED DESCRIPTION OF THE PREFERRED EMBODIMENTS

The present invention will be described in detail in the following with reference to the accompanying drawings after a data transmission system, a transmission controller and so on providing a basis for the invention have been summarized.

Figure 1:
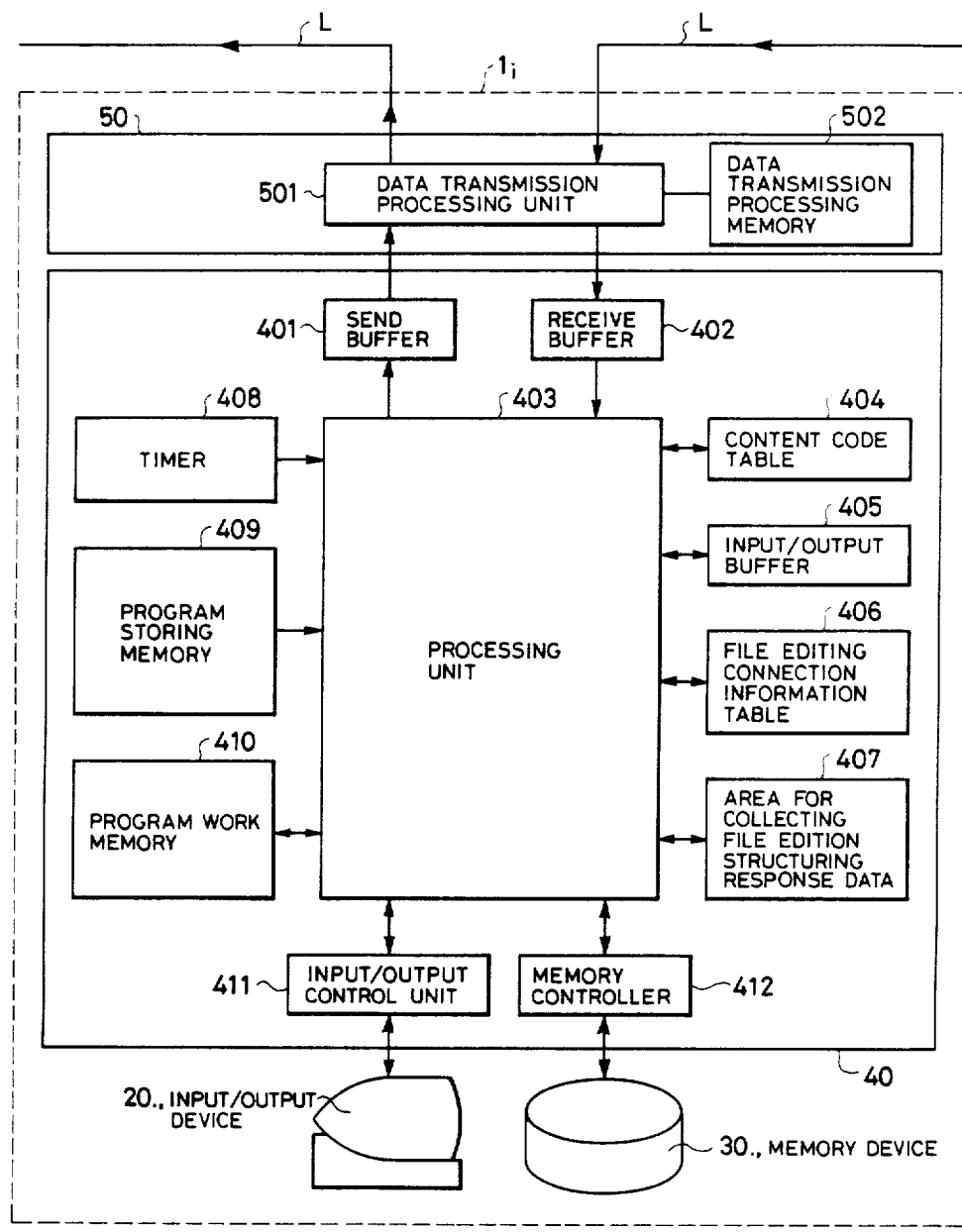
FIG. 1 is a block diagram showing a processing unit to be used in the distributed file editing system according to one embodiment of the present invention.
Figure 2:
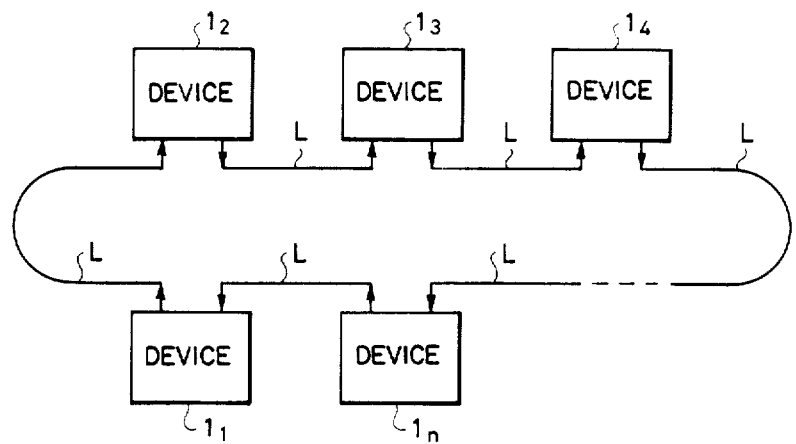
FIG. 2 is a block diagram showing the whole structure of a data transmission system and devices connected thereto.

FIG. 2 is a block diagram showing the structure of the data transmission system to which the present invention is applied. Devices, n in number, $1_1$, $1_2$, - - -, and $1_n$ are connected to a one-way transmission line L or a common signal transmission line. The i-th device $1_i$ is structured, as shown in FIG. 1, of a man-machine input/output device 20, a memory device 30, an information processing device 40 and a data transmission control device 50.

The data transmission control device 50 and the information processing device 40 will be described in the specified order in the following in connection with their detailed structures.

(1) Data Transmission Control Device

This data transmission control device 50 is structured of a data transmission processing unit 501 and a data transmission processing memory 502. A message is sent from this data transmission control device 50 to the transmission line L according to the format shown in FIG. 3.

Figure 3:
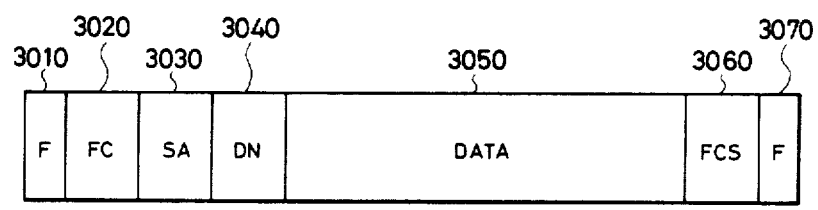
FIG. 3 is a diagram showing the format of a message flowing on a transmission line.

In FIG. 3: reference numerals 3010 and 3070 denote areas for setting flags indicating the start and end of the message; numeral 3020 an area for setting a content code given to the content of a data set in an area 3050; numeral 3030 an area for setting the address of a device having sent the message; numeral 3040 an area for setting the serial number of the sent message; numeral 3050 an area for setting data; and numeral 3060 an area for setting a frame check sequence for checking the transmission error of the message.

The message sent to the data transmission line L is sequentially relayed by the individual data transmission control devices on the data transmission line L to circulate this line L until it is received and erased by the source data transmission control device. On the other hand, each data transmission control device extracts the content code 3020 of the message when it receives this message from the data transmission line.

Next, the data transmission processing memory 502, which has stored in advance the content code of the data required by the device $l_i$, is examined to check whether or not the same content code as that of the message received is registered. Only if the result of the comparison is YES will the received message be converted into the format shown in FIG. 4, which is sent to a receive buffer 402 of the information processing device 40.

Figure 4:
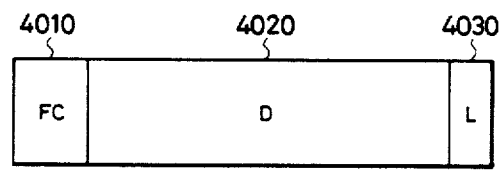
FIG. 4 is a diagram showing the format of data in an information processing unit.

In FIG. 4, reference numerals 4010, 4020 and 4030 denote areas for setting the content code, the data and a marker indicating the end of the data, respectively.

(2) Information Processing Device

This information processing device 40 has stored in program storing memory 409 a file edition program, a file edition structuring program, another application program, and a data input/output for managing the input and output of data between those foregoing programs and the data transmission control device 50. A processing unit 403 executes the aforementioned programs sequentially in a sequential manner.

The present invention processing device 40 is characterized in that it internally has an area 407 for collecting file edition structuring response data and a timer 408 to be used for collecting the data of the area 407; and in that the program storing memory 409 stored a program for collecting the aforementioned file edition structuring response data. These points will be sequentially described in detail in the following.

The data input/output management, the file edition, and the file edition structuring for realizing the present invention will be described in the following.

(2 - 1) Data Input/Output management

The processing unit 403 reads data (which will be hereinafter called the "received data") from the receive buffer 402 and extracts its content code. Next, reference is made to a content code table 404 in which the content code of the data required by each program except the data input/output management program in the program storing memory 409 is registered for each program.

Figure 5:
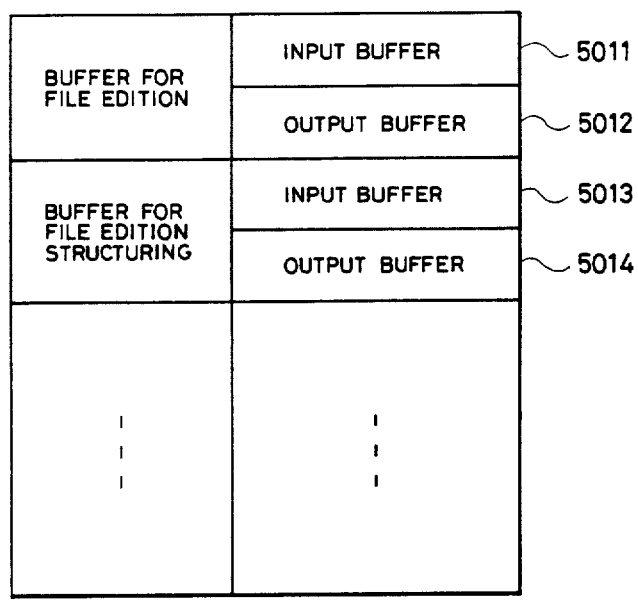
FIG. 5 is a diagram showing the internal structure of an input/output buffer.

The content code of the aforementioned received data is stored, if it is registered in the content code table 404, in an input/output buffer 405 of the program requiring that data. The input/output buffer 405 is structured, as shown in FIG. 5, of an input/output buffer of each program.

Next, in order to send the output data of each program to the data transmission control device 50, an output buffer is searched for each program, and the data, if any, is stored in a send buffer 401 and a receive buffer 402.

(2 - 2) File Edition

The file edition is to edit the data, which is stored in each memory device, by filing the individual devices with one another through the aforementioned common signal transmission line L. The edition data flowing on the data transmission line L are sequentially connected by the individual devices in accordance with their edited states.

By this file edition, the three content codes, i.e., the content code of the data for providing a trigger to start the file edition of each device, the content code to be given to the data in the course of the edition and the content code to be give to the data having been edited are caused to correspond in accordance with the combination of the files to be edited. In other words, for the file edition having a different combination of the data to be edited, the above-specified content codes of different combinations are cause to correspond.

Figure 6:
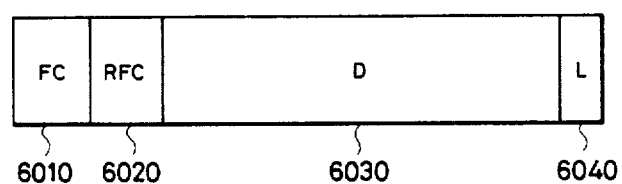
FIG. 6 is a diagram showing the format of file editing data.

On the other aand, the format of the data (which will be hereinafter called the "file editing data") in the course of the edition is determined, as shown in FIG. 6 In FIG. 6, reference numerals 6010, 6020 and 6040 denote areas for setting the content codes, a right end content code RFC indicating the content of the data connected to the right end of the edition data body to be set in an area 6030, and a marker indicating the end of the data, respectively.

Figure 7:
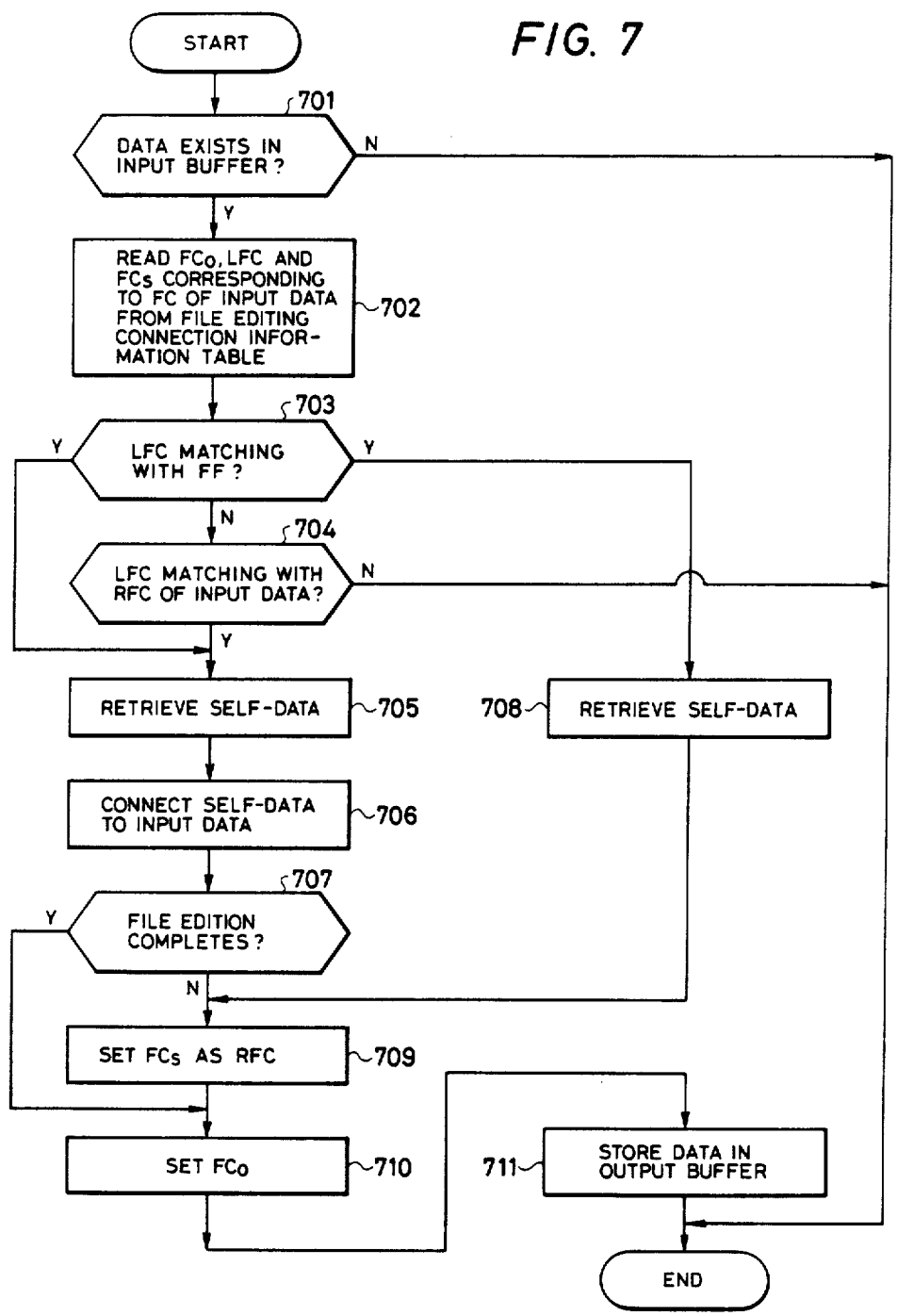
FIG. 7 is a flowchart showing the file editing process of each device.

This file edition to be processed by each device will be described with reference to FIG. 7.

First of all, it is checked (at a step 701) whether or not a data exists in a file editing input buffer 5011 shown in FIG. 5. Only if YES, a file editing connection information table 406 is referred to conduct the following editions.

Figures 8, 9A:
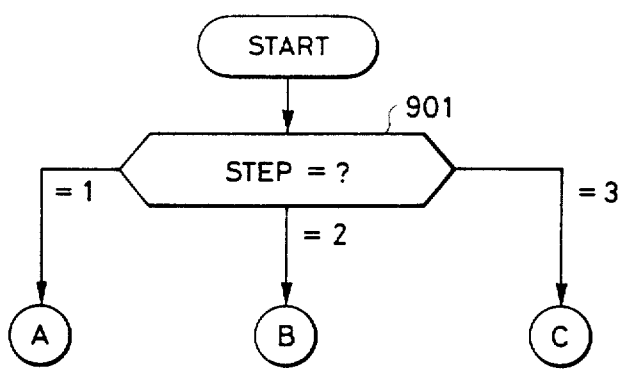
FIG. 8 is a diagram showing the structure of file editing connection information table.
FIGS. 9(A) to 9(D) are flowcharts showing the file edition structuring process.

Incidentally, the aforementioned file editing connection information table 406 is a table having a structure shown in FIG. 8 and is registered with a content code $FC_S$ of its own data to be connected to a content code $FC_I$ of the input data, left end connection information LFC indicating what content code data is connected to the left side of self-connection data, and a content code $FC_O$ given to the data when the self-connection data is to be stored in the output buffer after it has been connected.

Incidentally, in cas the file edition is to be started from that device, the LFC is set at "FF".

At first, the aforementioned output content code $FC_O$, left end connection infromation LFC and self-connection data content code $FC_S$ corresponding to the content code of the data (which will be hereinafter called the "input data") read from the aforementioned input buffer 5011 are read (at a step 702) from the aforementioned file editing connection information table 406.

Next, in order to judge whether or not the file edition is started from that device, it is checked (at a step 703) whether or not the aforementioned left end connection infromation is the "FF". If YES, the self-connection data is retrieved (at a step 708) from the memory device 30 through the memory administering unit 40, and the file editing data, in which the aforementioned self connection data content code $FC_S$ is set as the right end content code whereas the content code is set in the aforementioned output content code $FC_O$, are produced and stored (at steps 709 to 711) in the output buffer.

If the aforementioned left end connection information LFC is not the "FF", on the contrary, it is judged that the input data is the file edition data, and its right end content code RFC is read from the input data and is checked (at a step 704) whether it matches with the left end connection information LFC. If YES, the self-connection data is retrieved (a a step 705) and connected to the right end of the input data.

Next, whether or not the file edition has been completed is checked (at a step 707) by confirming that the aforementioned input content code $FC_I$ and output content code $FC_O$ are different and that the left end connection information LFC is not the "FF".

If NOT (i.e., $FC_I = FC_O$), the content code $FC_S$ of the aforementioned self-connection data is set as the right end content code RFC of the aforementioned input data, and the file editing data having the output content code set at $FC_O$ is generated (at the steps 709 and 710) and is stored (at the step 711) in an output buffer 5012. If the file edition has been completed (i.e., $FC_I$, $FC_O$, and LFC="FF"), only the edition data, from which the right end content code RFC is eliminated, is set as the data body, and the data having the content code set as the aforementioned $FC_O$ is produced (at the step 710) and stored in the aforementioned output buffer 5012.

As is apparent from the description thus far made, it is a prerequisite for the aforementioned file edition that each device has the file editing connection information table in advance. It is the file edition structuring process constituting the gist of the present invention, as will be described hereinafter, that the file editing connection table is structured by filing the individual devices.

(2 - 3) File Edition Structuring

It is the presen file edition structuring that each device is started, at an instant when it receives the file edition structuring data, and filed to structure the content of the file editing connection information table 406 which is required for the file edition described at (2 - 2). The present process is composed of the following three steps:

① Initialization of File Edition Structuring;
② Collection of File Edition Structuring Response Data; and
③ Confirmation of File Edition Structuring. The program for this file edition structuring judges, upon each start, what of the aforementioned three steps is conducted at present (as shown in FIG. 9(A)).

The judgement is conducted by setting a variable "step" indicating the step to check what value of "1", "2" or "3" the variable has. Moreover, the value of the "step" set above is set at "1" at the start up of the system and is sequentially incrementedwwhen each of aforementioned steps ① to ③ is normally ended and shifted to a next step. In case, however, the aforementioned is step ③ is normally ended, the value of the "step" is returned to the initial value "1".

Figure 9B:
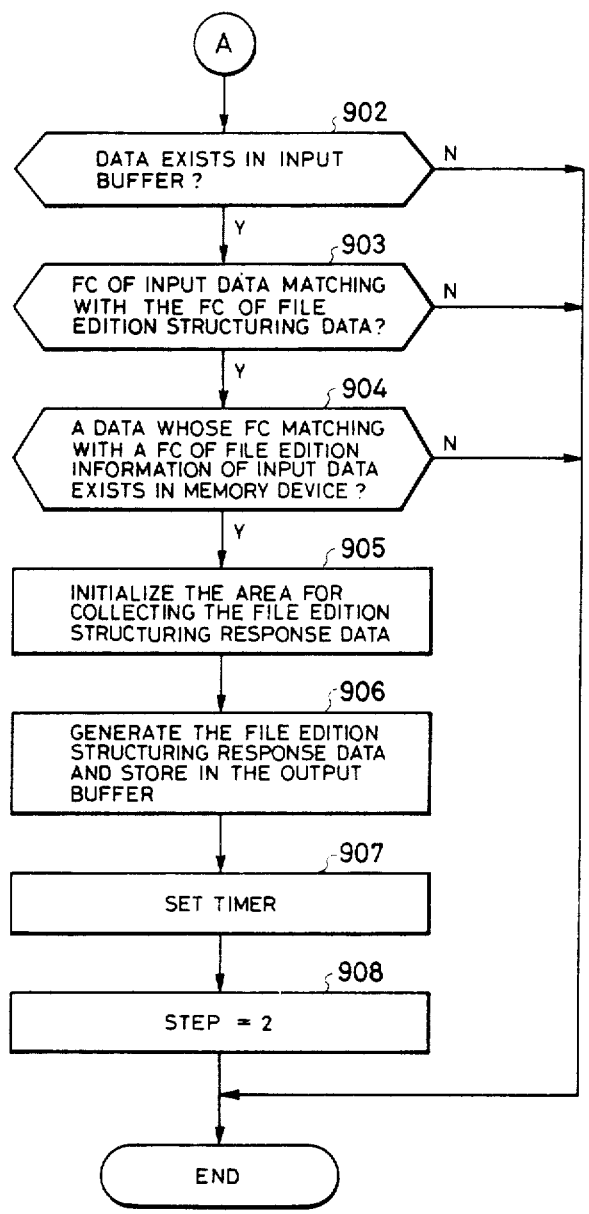
Figure 9C:
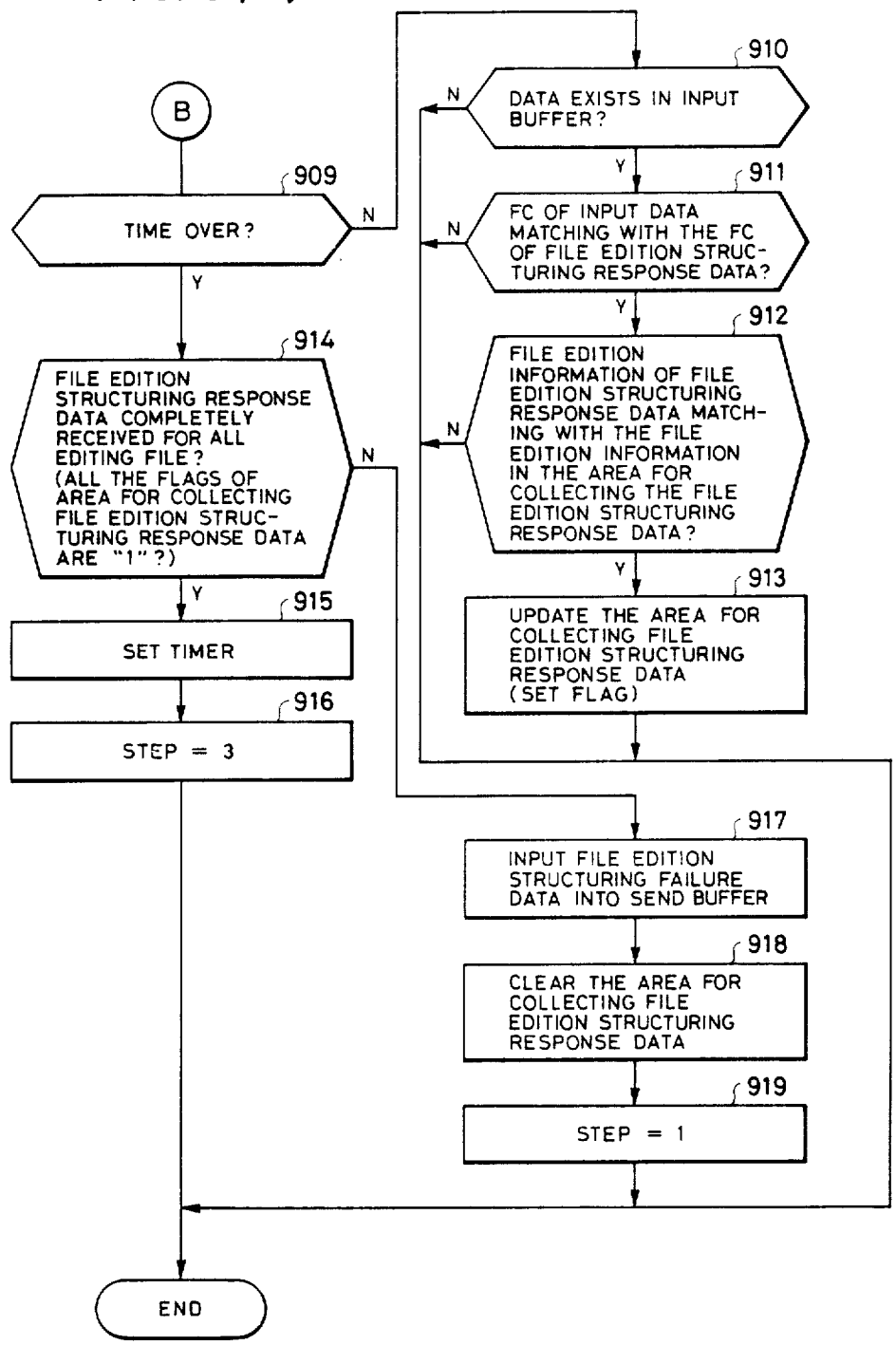
Figure 9D:
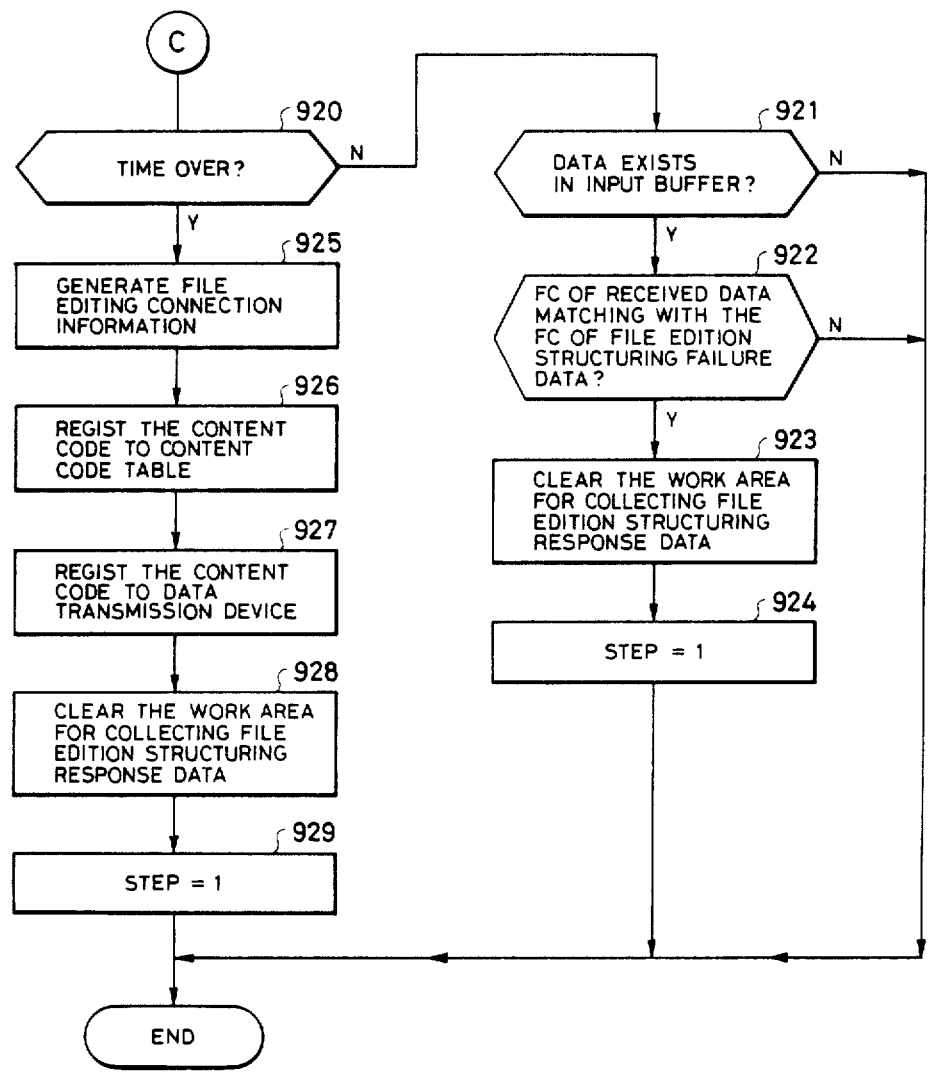

The file edition structuring process will be described separately for the aforementioned three steps in the following with reference to FIGS. 9(B) to 9(D).

① Initialization of File Edition Structuring

It checked (at a step 902) whether or not data exists in a file edition structuring input buffer 5013 (FIG. 5). If YES, it is checked (at a step 903) whether or not the content code is the content code of the file edition structuring data. Here, the format of the data body of the file edition structuring data is shown in FIG. 10. Reference numerals 1001 to 1003 denote informations for discriminating the file edition. The information 1001 is a content code $FC_T$ (or a trigger FC) for providing a trigger of the file edition. The information 1002 is a content code $FC_R$ (or the file edition FC) given to the file edition data at an intermediate step of the edition. Moreover, the information 1003 is a content code $FC_E$ (or the file completion FC) given to the data having its file edition completed. Incidentally, reference numeral 1004 denotes the number $N_F$ of the data to be edited in the first edition, and numerals 1005 and denoted content codes of data, $N_F$ in number, to be edited. It is assumed that the data be edited from the left in the recited order.

Moreover, the content code of the file edition structuring data is set at $FC_{RES}$.

If the input data is the file edition structuring data, its data body is referred to examine (at a step 904) whether or not a data having the same content code as that of the data for the file edition exists in the memory device 30 of its own. If NO, the process is ended. If the data having the same content code as that of the data for the file edition exists, the area 407 for collecting the file edition structuring response data is initiaiized (at a step 905) on the basis of the file edition structuring data received, as shown in FIG. 11.

In FIG. 11: area 1101 to 1103 are areas for setting the aforementioned trigger FC, file edition FC and edition completion FC of the received file edition structuring data; areas 1105, 1107, 1109 and 1111 are areas for setting the content codes of the data to be edited; and areas 1106, 1108, 1110 and 1112 are flags indicating whether or not the data of the content codes of the areas 1106, 1107, 1109 and 1111 are stored in the memory device of its own. The flag corresponding to the content code of the data stored in the memory device of its own is set at "1" FIG. 11 shows the case in which the area "$FC_2$" exists in that device.

Next, the file edition structuring response data having the aforementioned area 407 for collecting the file edition structuring response data as its data body is generated and stored (at a step 906) in the aforementioned output buffer 5012. The format of this file edition structuring response data is shown in FIG. 12.

Next, in order to collect the file edition structuring response data from another device, the timer is set (at a step 907), and the value of the aforementioned "step" is set at 2 (at a step 908), thus ending the initialization of the file edition structuring.

② Collection of File Edition Structuring Response Data

With reference to the timer, the file edition structuring response data are collected (at steps 907 to 913) until a constant time perood ($T_1$) elapses after the collection has been started. Here, the period $T_1$ is predetermined considering the data transmission delay time and the processing speed of hhe processing unit of each device.

In case the file edition structuring response data is received, it is examined (at the step 912) whether or not its file edition informations, i.e., the trigger FC, the file edition FC, the edition completion FC and the number of edition data matches with the values of the aforementioned areas for collecting the file edition structuring response data. If YES, the edition data informations (denoted at 1205 to 1212 in FIG. 12) of the received file edition structuring response data are examined. If the content code having its flag set at "1" exists, the flag of the corresponding area 407 for collecting the file edition structuring response data is set (at the step 913) at "1".

Next, if the constant period (T$_1$) has elapsed, it is checked (at a step 914) whether or not all the flangs of the edition data of the aforementioned area 407 for collecting the file edition structuring response data are at "1". If YES, the timer is set (at a step 915) so as to check whether or not the file edition structuring failure data has been sent from other devices, and the value of the "step" is set at "3", thus ending the process.

If, in the above case, when at least one of the flags of the area 407 for collecting the file edition structuring response data is "1", it is judged that the file edition structuring has failed. The file edition structuring failure data, as shown in FIG. 13, is generated and stored (at a step 917) in the send buffer, and the aforementioned area 407 for collecting the file edition structuring response data is cleared (at a step 918) to set the value of the "step" at "1", thus ending the process.

Figure 13:
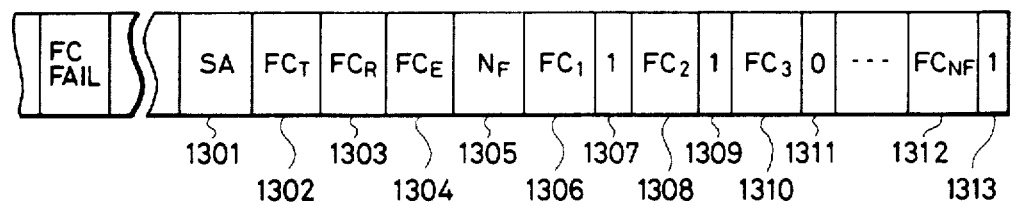
FIG. 13 is a diagram showing the format of a file edition structuring failure data.

In FIG. 13, incidentally, an area 1301 is an area for setting the numbers of the devices, and areas 1302 to 1313 are areas for setting the state of the area 407 for collecting the final file edition structuring response data.

③ Confirmation of File Edition Structuring

Before a constant time period (T$_2$) has elapsed with reference to the timer, it is checked (at steps 920 to 922) whether or not the file edition structuring failure data being structured is received from another device. Here, the time period T$_2$ is predetermined like the foregoing time period T$_1$ by considering the data transmission delay time and the processing speed of the processing unit.

If the file edition structuring failure data is received for the constant time period (T$_2$), the aforementioned area 407 for collecting the file edition structuring response data is cleared (at a step 923), and the "step" is set (at a step 924) at "1", thus ending the process.

In case the file edition structuring failure data is not received even after lapse of the constant time period (T$_2$), the file editing connection information having succeeded in being structured at this time is registered (at a step 925) in the aforementioned file editing connection information table 406 on the basis of the information of the aforementioned area 407 for collecting the file edition structuring response data. The method of this registration will be described in the following.

(a) That of the content code of the editing data information of the file editing connection information table 406, which is stored in the memory device of its own, is set in the area of the self-connection data content code FC$_2$.

(b) If the self-connection data content code is set in the left end of the file edition, i.e., in the first of the edition data of the area for collecting the file edition structuring response data, the trigger FC is set in the area of the input content code FC$_I$, the file edition FC is set in the area of the output content code FC$_O$, and the "FF" is set in the area of the left end connection information LFC.

(c) If the self-connection data content code is in the course of the file edition, the file edition FC is set in the areas of the input content code FC$_I$ and the output content code FC$_O$, and the left end content code of the self-connection data is read from the aforementioned area 407 for collecting the file edition structuring response data and is set in the area of the left end connection information LFC.

(d) If the self-connection data content code is at the final end of the file edition, the file edition FC is set in the area of the input content code FC$_I$, the edition completion FC is set in the area of the output content code FC$_O$, and the left side content code of the self-connection data is set like the step (c) in the area of the left end connection information LFC.

Incidentally, in case the self-connection data are plural, the aforementioned steps (a) to (d) are repeated for each self-connection data.

After the process described above, the input content code registered newly in the file editing connection information table is registered (at steps 926 and 927) in the aforementioned content code table 404 and data transmission control device 50. Next, the aforementioned area 407 for collecting the file edition structuring response data is cleared (at a step 928), and the "step" is set (at a step 929) at "1".

Next, the procedures of the file edition structuring process described above will be specifically described with reference to FIGS. 14 to 17.

Figure 14:
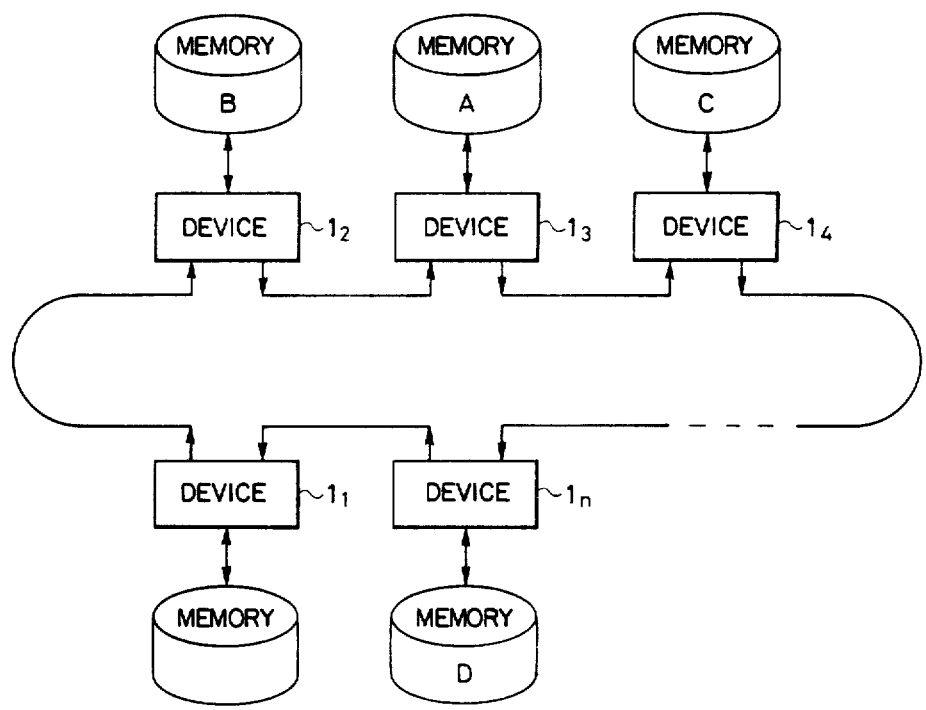
FIG. 14 is a block diagram showing the data storage state of the embodiment.

FIG. 14 shows the state in which the memory devices of the devices 1$_2$, 1$_3$, - - -, and 1$_n$ are stored with data B, A, - - -, and D having content codes FC$_B$, FC$_A$, - - -, and FC$_D$, respectively.

Figure 15A:
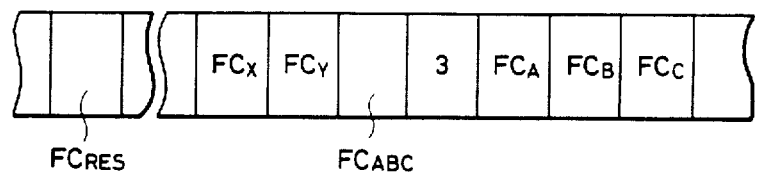
FIG. 15(A) is a diagram showing a specific example of the file edition structuring data.
Figure 15B:
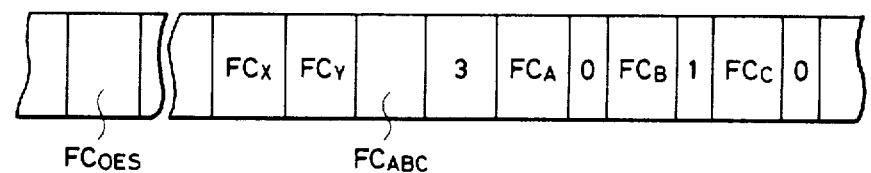
FIGS. 15(B) to 15(D) are diagrams showing specific examples of the file edition structuring response data.
Figure 15C:
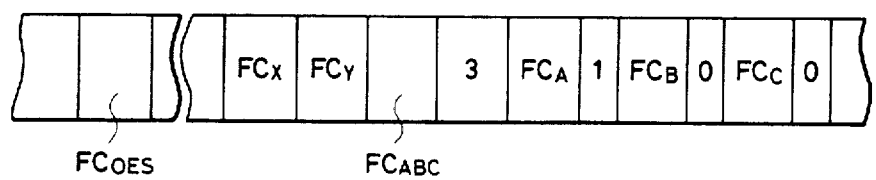
Figure 15D:
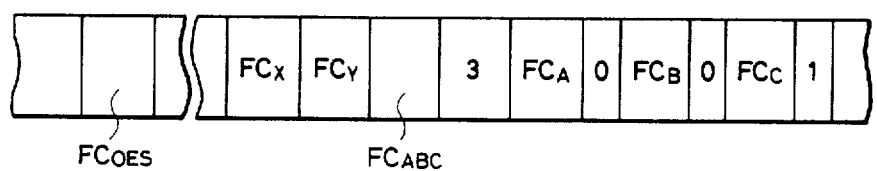

Now, let it be assumed that the file edition structuring data for editing the data A, B and C be sent from the device 1$_1$ to the aforementioned data transmission line L, as shown in FIG. 15(A). This file edition structuring data is received by each device to initialize the aforementioned file edition structuring. As a result, in the devices 1$_2$, 1$_3$ and 1$_4$, the area for collecting the file edition structuring response data is initialized, as shown FIG. 16(A). As shown in FIGS. 15(B) to 15(D), moreover, the file edition structuring response data are sent from the respective devices 1$_2$, 1$_3$ and 1$_4$ to the data transmission line.

These file edition structuring response data are collected by the devices 1$_2$, 1$_3$ and 1$_4$, and their respective areas come into the statesshown in FIG. 16(B) after lapse of the constant time period T$_1$. In case, moreover, the file edition structuring failure data is not received even after lapse of the constant time period T$_2$, each of the devices 1$_2$, 1$_3$ and 1$_4$ generates the file editing connection information table, as shown in FIG. 17, to end a series of file edition structuring process.

After the end of the file edition structuring process described above, the devices can be filed to edit the data A, B and C on the basis of the file editing connection table structured by the process described above. Specifically, each time a message having a content code FC$_X$ flows through the data transmission line L, each device having received it starts the file edition shown in FIG. 7.

More specifically, at first, the data A is retrieved by the device 1$_3$, and a message having content code FC$_Y$ is sent to the data transmission line L by using the data A as the data body. Next, for that message, the device 1$_2$ retrieves the data B and connects it to the right side of the data A. After this, the data is given the content code FC$_Y$ and is sent to the data transmission line L. Next, for this message, the device 1$_4$ retrieves the data C and connects it to the right side of the data A and B. After this, an edition completion data given a content code FC$_{ABC}$ is sent to the data transmission line L.

Incidentally, the example described hereinabove is directed to the case in which the file edition structuring process succeeds. In the case of failure, however, the file editing connection information table is neither structured in each device, not is started the file edition even if the message having the content code $FC_X$ flows through the data transmission line.

According to the present embodiment, the file edition program, the file edition structuring program and another application program are started in a circulating manner by the processing unit. As a result, there can be attained and effect that no conflict occurs in the file editing connection information which is accessed commonly by the file information which is accessed commonly by the file edition program and the file edition structuring program.

As has been described hereinbefore, according to the present invention, the file edition for editing a desired combination of files can be structured even if the whole structure of the files of the system is unknown, and the file edition can be structured by contracting or expanding devices even if the structure of the files fluctuates. The expandability of the edition of the dispersed files can be improved.

In the structure of the file edition table, moreover, each device participating in the structuring is enabled to judge the structuring capability and to inform another device of its incapability. As a result, the reliability of the file edition structuring process can be improved.

According to the present invention, still moreover, the aforementioned file edition structuring process can be executed while leaving the structure of each sub-system even. As a result, there can be attained another effect that the expandability and maintenability of the system can be enhanced with an improved reliability.

What is claimed is:

1. In a file editing system for sequentially connecting files, which are stored in memory devices of a plurality of distributed devices connected to a common signal transmission line, to edition data flowing on said common signal transmission line, a distributed file editing method comprising the steps of:
sending a structuring message having a combination and order to files to be connected to said common signal transmission line;
judging whether or not its own file is contained in files to be edited on a basis of said structing message and its own connection information when it receives said structuring message;
sending a response message having information of said file to said common signal transmission line if its own file is contained; and
structuring connection information required for file edition in itself on a basis of said structuring message in case it is confirmed through said message that all files to be edited exist in said system.

2. A distributed file editing method according to claim 1, further comprising a step of collecting said response message from another of said distributed devices for a predetermined time period.

3. A distributed file editing method according to claim 1, wherein said file structuring step is suspended to send a structura failure message to said common signal transmission line in case it is judged through said message that all files to be edited do not exist in said system.

4. A distributed file editing method according to claim 2, wherein a response messsage from said another distributed device is collected for a predetermined time period.

5. A distributed file editing method according to claim 3, further comprising:
collecting said response message for a predetermined time period;
collecting said structural failure message for a predetermined time period in case it is judged through said collected response message that all files to be edited exist in said system; and
structuring said connection information if said structural failure message is not received and suspending said structuring step if said structural failure message is received.

6. In a file editing system for sequentially connecting files, which are stored in memory devices of a plurality of distributed devices connected to a common signal transmission line, to edition data flowing on said common transmission line, a distributed file editing system wherein each of said distributed devices comprises:
means for sending a structuring message having a combination and order of files to be connected to said common signal transmission line;
means for judging whether or not its own file is contained in files to be edited on a basis of said structuring message;
means for sending a response message having information of said file to said common signal transmission line if its own file is contained; and
means for structuring connection information required for file edition itself on a basis of said structuring message in case it is confirmed through said message that all files to be edited exist in said system.

7. A distributed file editing system according to claim 6, wherein each of said distributed devices further comprises means for collecting said response message from another of said distributed devices for a predetermined time period.

8. A method for editing distributed files which are stored in memory devices of a plurality of distributed devices connected to a common signal transmission line, comprising the steps of:
sending an editing format relating to a combination of distributed filed from at least one distributed device to said common signal transmission line;
receiving said editing format in at least one other distributed device from said common signal transmission line;
judging at said other distributed device whether or not it stores a file to be edited on the basis of said editing format; and
editing, in said other distributed device, the files to be edited on the basis of said editing format when it is judged that the files are to be edited.

9. A distributed file editing method according to claim 8, which further includes a step of sending a message having the information of the file to be edited from said other distributed device when the file is to be edited, thereby to edit, in said at least one distributed device receiving said message, said message and a file stored therein on the basis of said editing format.

* * * * *